United States Patent
Vermaat

(10) Patent No.: US 7,780,065 B2
(45) Date of Patent: *Aug. 24, 2010

(54) METHOD AND DEVICE FOR WELDING PIPES

(75) Inventor: Huibrecht Pieter Vermaat, Rockanje (NL)

(73) Assignee: Vermaat Technics B.V., Rockanje (NL)

( * ) Notice: Subject to any disclaimer, the term of this patent is extended or adjusted under 35 U.S.C. 154(b) by 610 days.

This patent is subject to a terminal disclaimer.

(21) Appl. No.: 11/796,746

(22) Filed: Apr. 27, 2007

(65) Prior Publication Data

US 2007/0256288 A1    Nov. 8, 2007

Related U.S. Application Data

(63) Continuation-in-part of application No. 10/995,918, filed on Nov. 23, 2004, now Pat. No. 7,540,401, which is a continuation of application No. 10/138,024, filed on May 2, 2002, now Pat. No. 6,840,433, which is a continuation of application No. PCT/NL00/00792, filed on Nov. 1, 2000.

(30) Foreign Application Priority Data

Nov. 3, 1999    (NL) .................................... 1013477

(51) Int. Cl.
    *B23K 5/08* (2006.01)
(52) U.S. Cl. ...................... 228/212; 228/44.5; 228/49.3
(58) Field of Classification Search ................ 228/49.3, 228/29, 44.3, 213, 212, 44.5, 49.1; 219/125.11, 219/60 A; 29/464; 269/42, 43, 45, 41, 58
    See application file for complete search history.

(56) References Cited

U.S. PATENT DOCUMENTS 2,167,887 A    8/1939    Graham et al.
2,463,907 A    3/1949    Risley et al.

(Continued)

FOREIGN PATENT DOCUMENTS

DE    3937094    5/1990

(Continued)

OTHER PUBLICATIONS

English Abstract of JP 61078596, dated Apr. 22, 1986.

(Continued)

*Primary Examiner*—Roy King
*Assistant Examiner*—Michael Aboagye
(74) *Attorney, Agent, or Firm*—Ladas and Parry LLP

(57) ABSTRACT

A method for welding a plurality of pipes, including first, second and third pipes, to each other, the method comprising the steps of:
(a) providing a clamping apparatus comprising a rigid frame, first and second clamping means for clamping the pipes, said first and second clamping means being supported on the frame;
(b) engaging a side of the first pipe with the first clamping means and a side of the second pipe with the second clamping means and with a first end of the first pipe disposed at a welding distance from and in line with a first end of the second pipe;
(c) operating a welding apparatus to make a welding seam to connect the respective first ends of the first and second pipes; and
(d) moving the clamping apparatus along the second pipe to a second end of the second pipe and repeating steps (b)-(c) to weld the second end of the second pipe to a first end of the third pipe, wherein the method comprising the steps of determining a shape of the first pipe with help of the first clamping means, storing data pertaining to said shape in a memory as shape data, and bringing the second clamping means into engagement with the second pipe based on the shape data.

15 Claims, 7 Drawing Sheets

U.S. PATENT DOCUMENTS

| | | | |
|---|---|---|---|
| 2,960,597 A | 11/1960 | Bruno et al. |
| 3,256,418 A | 6/1966 | Bauer et al. |
| 3,933,292 A | 1/1976 | Martin |
| 4,145,593 A | 3/1979 | Merrick et al. |
| 4,175,224 A | 11/1979 | Sims et al. |
| 4,565,003 A | 1/1986 | McLeod |
| 4,722,468 A | 2/1988 | McClure |
| 4,750,662 A | 6/1988 | Kagimoto |
| 5,052,608 A | 10/1991 | McClure |
| 5,164,160 A | 11/1992 | Pelletier et al. |
| 5,165,160 A | 11/1992 | Poncelet |
| 5,685,996 A | 11/1997 | Ricci |
| 5,865,430 A | 2/1999 | Conover et al. |
| 6,325,277 B1 | 12/2001 | Collie |
| 6,355,899 B1 | 3/2002 | Kane et al. |
| 6,840,433 B2 * | 1/2005 | Vermaat | 228/212 |

FOREIGN PATENT DOCUMENTS

| | | |
|---|---|---|
| GB | 2249982 | 5/1992 |
| JP | 57168797 | 10/1982 |
| JP | 61078596 | 4/1986 |
| JP | 05192793 | 8/1993 |
| SU | 698743 | 11/1979 |

OTHER PUBLICATIONS

English Abstract of JP 57168797, dated Oct. 18, 1982.
English Abstract of JP 05192793, dated Aug. 3, 1993.
Derwent English Abstract of SU 698473, dated Nov. 28, 1979 (XP 002141503).

* cited by examiner

METHOD AND DEVICE FOR WELDING PIPES

This application is a continuation-in-part of application Ser. No. 10/995,918 filed on Nov. 23, 2004, (now U.S. Pat. No. 7,540,401) which is a continuation of application Ser. No. 10/138,024 filed on May 2, 2002 (now U.S. Pat. No. 6,840,433) which is a continuation of International Application PCT/NL00/00792 filed on Nov. 1, 2000, which designated the U.S., claims the benefit thereof and incorporates the same by reference.

BACKGROUND OF THE INVENTION

The invention relates to a method and a device for welding pipes or tubes to each other for forming pipe lines for for instance oil or gas, in which two pipes to be welded to each other are aligned with respect to each other and then a connecting weld is made. The invention particularly relates to welding stationary, lying pipes to each other.

It is known to use a so-called line-up clamp to that end, which clamp is moved within the pipes until on either side of the weld to be formed, and which, at that location, is brought into clamping engagement with the inner surfaces of the ends of the pipes to be welded together. The frame on which the clamping means for both pipes have been arranged provides a rigid orienting means, as a result of which the pipes will be exactly aligned before welding. Such an arrangement is for instance shown in Dutch patent application 90.02396. Here, after orienting the pipes an annular supporting frame for the welding equipment is placed at the outside of the pipes, using a mounting belt arranged earlier on on one of the pipes. For said technique, International patent application WO 95/21721 could also be referred to, in which document a line-up clamp which is mobile within the pipes is described.

The use of a line-up clamp which moves within the pipes, as for example disclosed in U.S. Pat. No. 3,462,059, requires special provisions, such as long operating lines, the length of which corresponds to the length of the pipe line made ready. Furthermore the line-up clamp has to be retrieved entirely in case it malfunctions. This results in considerable delays in the work.

It is an object of the invention to improve on this.

SUMMARY OF THE INVENTION

From one aspect the invention to that end provides a method for welding pipes to each other, in which a side of the one pipe is engaged tightly with the help of first clamping means and a side of the other pipe is engaged tightly with the help of second clamping means, in which the first and second clamping means are kept in line and with their ends close to or against each other by means of a rigid frame on which both clamping means are arranged, after which welding means are operated in order to make a welding seam for connecting both pipes, after which the frame with the first and the second clamping means is moved along the other pipe to the other end of the other pipe for repeating the aforementioned steps for welding the other pipe and a next pipe.

From a further aspect the shape of the one pipe is determined with the help of the first clamping means, said shape is stored in a memory as shape data, the second clamping means are brought into engagement with the other pipe and based on the shape data stored in the memory are urged into a position corresponding to the shape stored.

Thus it can be achieved that the contours of the end edges of both pipes have the same shape, so that the weld can be properly arranged and a reliable connection can be laid over the entire circumference. Pipes are usually a little deformed and different as to roundness, which by using the method according to the invention need not have detrimental effects any more, as the shape is now partly adjusted.

It is preferable here that after storing the shape data of the one pipe, the first clamping means are further operated until in a position in which the one pipe is clamped.

Preferably the second clamping means are operated to clamp the other pipe after said deformation movement. The second clamping means is engaged with the other pipe at a position determined by the stored shape data. The method comprising deforming the second pipe into a contour corresponding to a contour of the first pipe.

Preferably, after the second clamping means engages with the second pipe at a position determined by the stored shape data, the second clamping means is moved to a position at which it clamps the second pipe.

In a first embodiment the clamping means for the pipes to be welded together engage at the outside of the pipe, and they can always be reached well and can be checked. The operating lines can remain short here, despite the fact that they have to make the movement of the frame possible. Moving the frame over the pipes makes it possible to use the pipes as a guide and a support, as a result of which the frame can be kept simple.

It is noted that from European Patent application 0.119.636 it is known to use a stationary frame for welding vertical pipes to each other, which frame comprises a cage construction with two coaxial sleeves in it for accommodation of the two pipe ends, in which at the outside of the sleeves two clamping jaws acting on the sleeves are provided for fixating the pipes in their positions. The frame is furthermore provided with welding means. After arranging a weld the clamping means are detached and the upper pipe is pushed downward until said pipe and the pipe placed on it are accommodated in their respective sleeves, after which the process can start over again.

The initial placement is facilitated when the clamping means are arranged for a part of the circumference on a frame part which can be opened with respect to the rest of the frame, in which preferably the part of the frame that can be opened takes up approximately 180 degrees or more of the circumference in circumferential direction. As a result the entire frame can be placed in radial direction around the pipes that are to be welded together. Compared to the known line-up clamp that can be moved within the pipes and the aforementioned known welding device that works with clamping sleeves, the advantage is obtained that bringing the device to its destined place does not need much movement along the first pipe.

Preferably the frame is provided with, preferably hydraulic, operating means for moving the frame parts that can be opened.

In an advantageous manner the frame that is situated outside around the pipes can be used for an additional function, in that sense that the frame is furthermore provided with a wind shield for screening off the welding area radially to the outside.

Preferably the frame is furthermore provided with a longitudinal shell or structure extending in pipe centre line, which preferably has a circumference of 180 degrees or less. Said structure or said longitudinal shell can be advantageous for the aligning and for the movement of the frame, as well as for the support of the parts for the operation and drive of the parts of the device. It is advantageous here when the longitudinal shell or structure is provided with supporting or guidance rollers, which preferably in pipe centre line direction are in line with each other like several rollers.

In an alternative second embodiment, the clamping means for the pipes to be welded together engage at the inside of the pipe. In this case, the frame and the clamping means are adapted to move through the interior of pipe sections. For example, the frame can be provided with its own power source and control unit with a transceiver for receiving operating commands via a wire-less connection. Special provisions, such as long operating lines are not necessary for a remote controlled line-up clamp which moves within the pipes.

Preferably use is made of rollers on or at the frame for engagement of the inside or outside of the pipes, in which the rollers can be rotated about an axis perpendicular to the centre line of the pipes, in which way a simple guiding and supporting means for the frame on the pipes is used.

Preferably the frame is moved along the pipes by means of driving means provided on the frame, such as a driven roller for instance. External provisions can be kept limited as a result.

Alternatively it is possible to pull the frame on a cable, in which case the frame can remain lightweight and the movement can take place more quickly.

Preferably at least a first connecting weld is made between the pipes by means of welding means that are supported on the frame. Here the frame is used for other purposes, whereas the frame also ensures movement of said welding means, so that no additional measures need to be taken.

In a further development of the method according to the invention, the welding activities are split up, to which end after making the first connecting weld the frame is moved to a next pipe transition, and the weld is finished with the help of external welding means, preferably simultaneously to the movement or the making of the next first connecting weld. The—relatively expensive—line-up part here is used no longer than strictly necessary and it can be used again quickly for a next welding process. The weld connection is sufficiently strong here for holding both pipes together. The weld can be finished with simpler welding means.

From a further aspect the invention provides the measure that the first and second clamping means are arranged on two respective frame parts, which are connected to each other in an adjustable manner in pipe axis direction, in which the mutual axial distance of the end edges of both pipes is adjusted to the weld shape to be made.

From another aspect the invention provides a device for welding pipes to each other, comprising a rigid frame having first clamping means for tightly engaging the side of the one pipe and having second clamping means for tightly engaging the side of the other pipe, having its end at welding distance from and in line with the end of the one pipe, and having means for moving the frame along and over the pipes after making the welded joint between the pipes.

Preferably the movement means comprise means for guiding engagement of the outside or inside of the pipes, which are preferably formed by rollers, for rolling support of the frame on the pipes.

Preferably the device according to the invention comprises welding means supported on the frame, such as in particular a welding robot guidance, and possibly means for welding gas supply and/or a welding wire supply. The service lines towards the device can be kept short and simple as a result. This may result in a largely independent combined aligning and welding device.

Preferably the clamping means comprise a circumferential series of clamping plates which can be radially retracted and extended, for direct engagement of the surfaces of the pipes. The division in clamping plates renders a better controllable clamping and aligning possible.

The aligning and guidance is promoted when several sets of rollers are present which are spaced apart in circumferential direction.

Preferably the first and the second clamping means are arranged on different frame parts, that are connected to each other by means of connection means that can be adjusted in axial direction, preferably (hydraulic) cylinders, in order to be able to adjust the position of the end edges to the desired position for the weld.

From a further aspect the device comprises means for operating the first clamping means, means for determining an abutment position of the first clamping means, means for storing the abutment position in a memory, means for operating the second clamping means, in which the means for operating the second clamping means are connected to the control means for moving the second clamping means to a position corresponding to the abutment position, based on the abutment position as stored in the memory.

Preferably the means for operating the first clamping means and the means for operating the second clamping means are adapted for urging the clamping means from the abutment position to a clamping position.

From a further aspect the device comprises spacing means, said spacing means are provided between the first and second clamping means and being supported on the frame. Said spacing means preferably comprises a circumferential series of spacers that are radially retractable and extendible.

From a further aspect the device comprises backing means, said backing means are provided between the first and second clamping means and being supported on the frame. Said backing means preferably comprise a circumferential series of backing shoes that are radially retractable and extendible.

From a further aspect the device comprises comprises welding means, said welding means is being supported on the frame. Said welding means is preferable provided between the first and second clamping means.

From a further aspect the device comprises third clamping means for clamping the pipes, said third clamping means being supported on the frame such that said first clamping means is positioned between said second and third clamping means.

From a further aspect the device comprises a transceiver for remote control of said device.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE DRAWINGS

Figure 1:
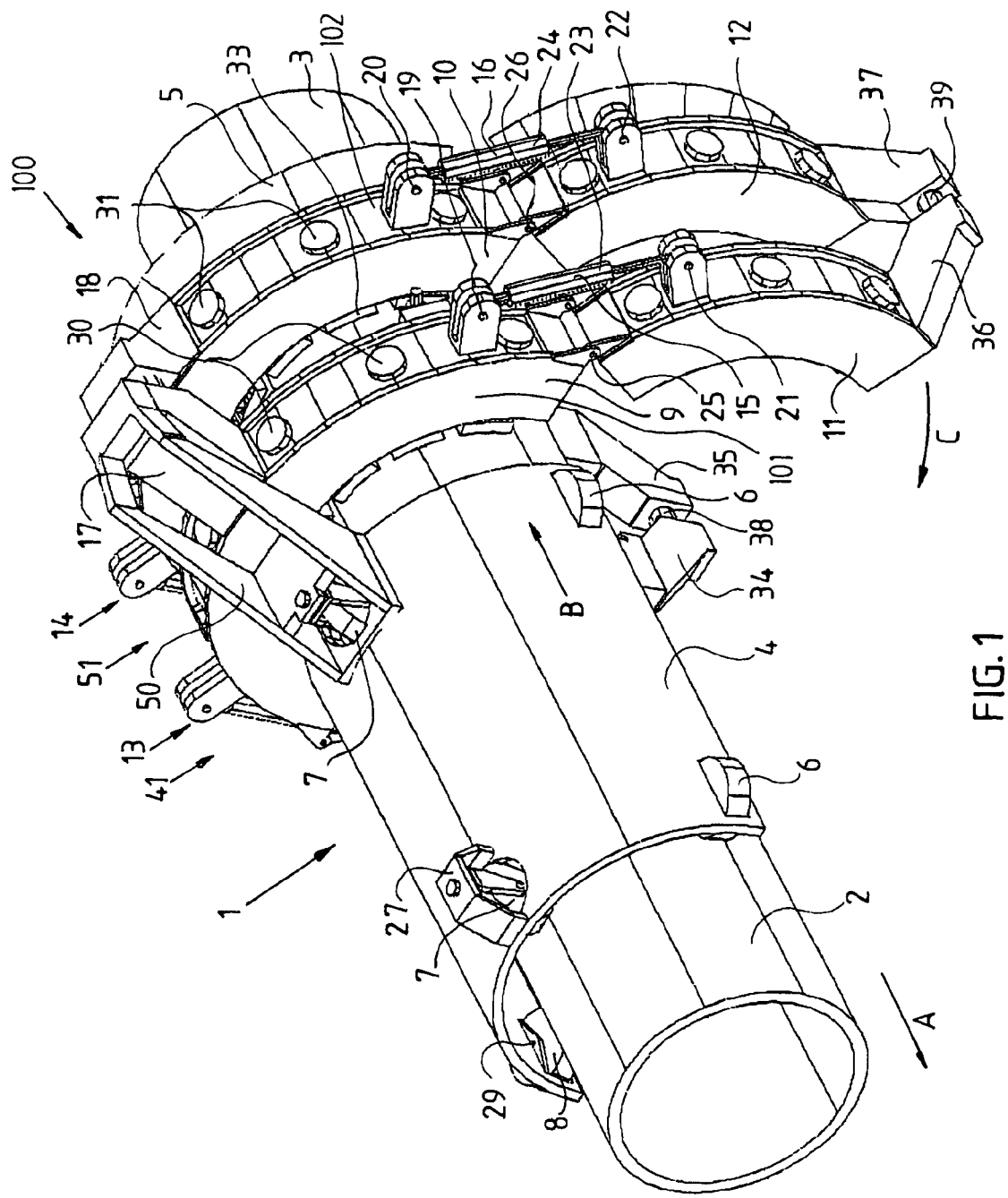
FIG. 1 shows a view in perspective of a device according to the invention, in a partly opened position.
Figure 2:
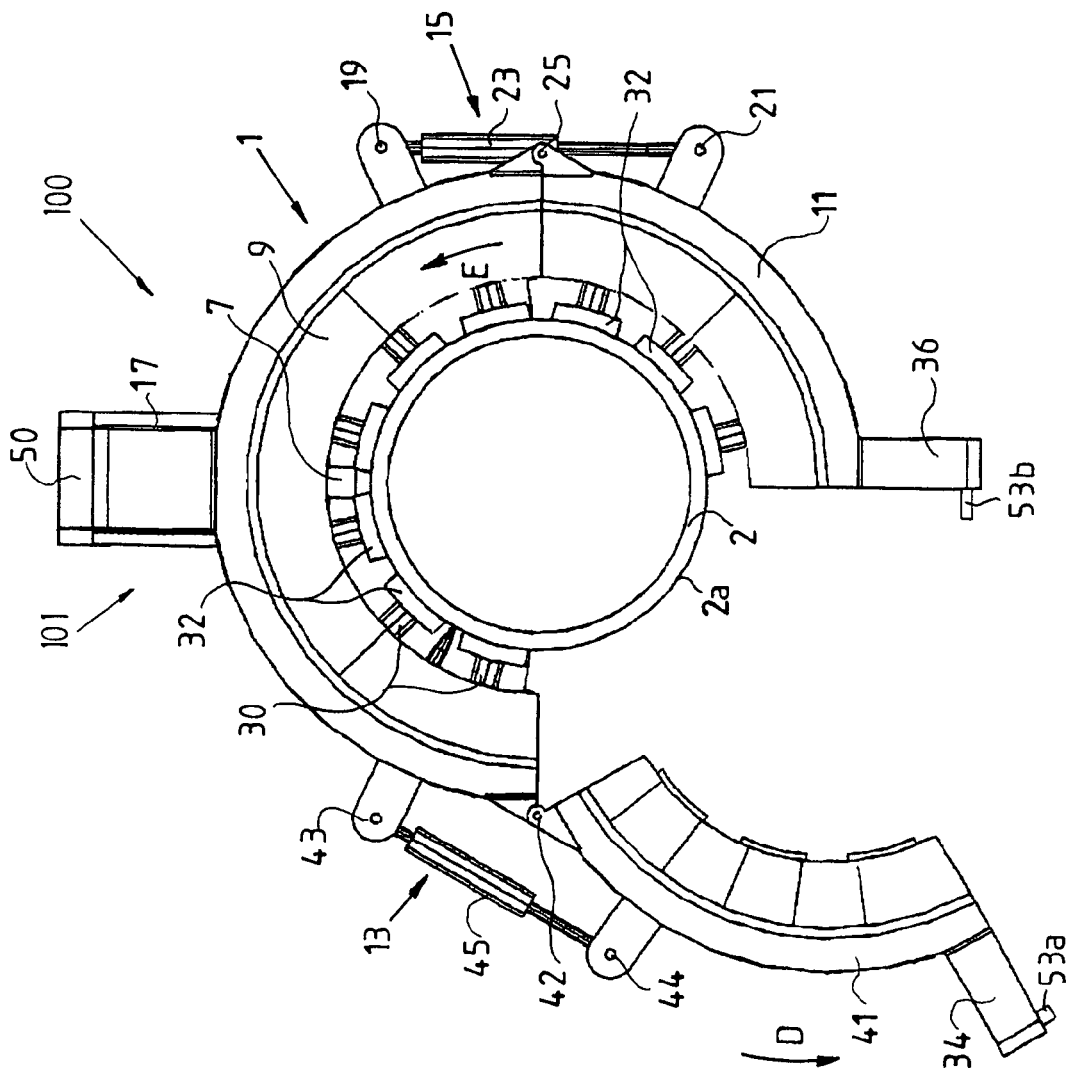
FIG. 2 shows an end view on the device of FIG. 1, in another position.

The aligning device 1 of the FIGS. 1 and 2 is used for aligning the pipes 2 and 3, which are situated with their end edges near each other. The pipes 2 and 3 are here supported by means that are not further shown, the pipe 2 for instance on blocks or a mound of soil, the pipe 3 hanging from a crane or also on a mound of soil. The part of the pipe line that is ready extends in the direction A.

The device 1 comprises a frame 100. The frame is substantially formed by two rings 101 and 102, in which clamping shoes 32 and 33, respectively, have been arranged in a radially extendable and retractable manner, in which in FIG. 1 the ends of the radially movable jacks 30 and 31, respectively, of the clamping shoes 32 and 33, respectively, can be seen.

The main parts of the rings 101 and 102 are semi-circular brackets 9 and 10, which at their ends are hingedly connected to bracket segments 11, 12 and 41, 51 by means of hinged joints 25, 26 and 42 (see FIG. 2: it will be understood that the bracket 10 is designed substantially identical to bracket 9). The bracket segments 11, 12 and 41, 51 are moreover connected to the brackets 9 and 10 by means of hydraulic cylinder assemblies 13, 14, 15, 16, and namely by means of hinged attachments 19, 20, 43 on the brackets 9 and 10, hinged joints 21, 22 and 44 on bracket segments 11, 12 and 41, 51 and cylinders 23, 24 and 45 attached in between them. Bracket segment 51 corresponds to bracket segment 41.

As can be seen in FIG. 2 the clamping shoes 32, 33 form series running in circumferential direction.

The frame 100 is further provided with supports 17 and 18 extending radially and axially from the brackets 9 and 10, which supports are connected to each other by means of cylinders 52a, 52b in a rigid, though axially adjustable manner. In a comparable manner supports 36, 37 and 34 and 35, respectively, extend from the bracket segments 11, 12 and 41, 51, which supports are connected to each other by means of cylinders 39 and 38 in the same manner as the supports 17 and 18.

Furthermore attached to the frame is a relatively long, semi-circle cylindrical shell 4 to the already part of the pipe line (which shell is short enough, however, to be able to traverse the bends of the pipe line) and a relatively short funnel 5 extending around the pipe 3, which funnel for that matter is divided. The shell 4 can also be formed like an open structure, such as a lattice structure. The shell 4 can be provided with running/supporting wheels 6, 7 and 8, with which the device 1 is supported on the pipes 2 and 3 and can be moved over it in the direction B. In this case the wheels or rollers 6 and 8 can rotate freely, to which end, as shown for the rollers/wheels 6 and 8, suspensions 27 and 29 have been provided. The rollers 7 are driven by means of a drive supported on the shell 4, which drive is not shown, and are bearing mounted in trestles 27. An active control can be provided for the rollers 7. A roller can furthermore be coupled to an inclinometer. Finally the exemplary embodiment 1 shown, according to the invention is provided with a bracket 50 which is attached to both the shell 4 and the frame and connects them to each other, from which bracket the device can be suspended during its placement and removal and by means of which the device 1 can be pulled in the direction B. Apart from the bracket 50 no constructive connection is necessary between the shell 4 and the frame 100.

The bracket assemblies 9, 10, 11, 12, 41, 51 assembled in the manner of FIG. 1, form as it were one frame and are moreover able to offer room to welding means, such as a guide for a welding robot extending in circumferential direction, the welding robot itself (see 80 in FIG. 3), gas supply means, wire supply means etc. Moreover the frame or shell 4 can offer room to driving means for the cylinders 23, 24, 45 and so on and for the clamping shoes 32 and 33 that are provided on the brackets and the bracket segments.

Furthermore a control and regulation unit (not shown) has been arranged on the frame 100 or on the shell 4, with which unit the various parts can be operated and controlled. Said unit particularly comprises a measuring device for determining the position of the clamping shoes 32 and 33, in particular at abutment against the wall of the pipe concerned, and storing said position in the memory.

When the pipes 2 and 3 have to be welded to each other with their ends, the device 1 is lowered on the bracket 50, until the wheels or rollers 6, 7, 8 find support on the outer surfaces of the pipes 2 and 3. In this way the device 1 is also somewhat centred with respect to the pipe 2. The pipe 3 is then still hanging from a crane. Subsequently the cylinders 23, 24, 45 are activated to urge the bracket segments 11, 12, 41, 51, according to rotation movements C and D, from the opened position into the closed position, for bracket 11 shown in FIG. 2. Subsequently a tangential coupling is made with the help of couplings 53a, 53b between the sup-ports 34 and 36 that are near each other, and the same for the other supports 35 and 37, so that an as it were continuous ring bracket is created. The funnel 5 here helps as orienting means for the pipe 3 hanging from the crane, which after that can be supported by placing a mound of soil under the pipe 3.

Subsequently the jacks 30 are operated to let the shoes 32 abut the outer surface of the pipe 2. Said position, which corresponds to the degree of radial expansion of the jacks in question, is noticed by the aforementioned measuring device, and on the basis thereof a contour sketch is made and stored in a memory. Subsequently the jacks 30 are driven to let the shoes 32 clamp the pipe 2.

The jacks 31 are then driven to bring the shoes 33 against the outer surface of the pipe 3 and subsequently move it to a position corresponding to the position as determined by the measuring device for the corresponding shoes 32, in order to obtain an identical contour sketch, by deforming the wall of the pipe 3 where necessary. When the contour of pipe 3 is already sufficiently of the same shape as pipe 2, adjustment of pipe 3 is of course unnecessary. The jacks 31 are subsequently driven to let the shoes 33 clamp the pipe 3 entirely, so that the pipes 2 and 3 are now both clamped and, as it were, form a unity with the frame 100 and as a result are fixed radially with respect to each other, in line with each other. It is noted that the jacks are adapted for generating sufficiently large clamping and deformation forces, such as for instance 3-4 tons.

Subsequently the hydraulic cylinders 38, 39, 52a and 52b are operated to bring the end edges of the pipes 2 and 3 at the wanted distance from each other for making the weld. In case of a V-seam a little distance is necessary, but in case of a J-seam not. When the wanted distance is reached the cylinders are fixed/secured in their expansion.

The aligning device 1 has been installed then and applying the welded joint can be started with the help of welding robot 80, which is moved in the circumferential direction E. With the device according to the invention adjustment can take place with such precision that for welding also laser welding methods can be used.

It is advantageous when welding to weld the pipes 2 and 3 to each other such that they are connected to each other in a movement fixed manner, to move the device 1 to a next welded joint to be made and to simultaneously finish the weld between pipes 2 and 3 with other welding means. When the pipe line in question is completed, the device 1 need not be moved to a location where it can be driven from the last pipe, but the bracket segments can simply be opened again and the device 1 can be hoisted away.

Figure 4:
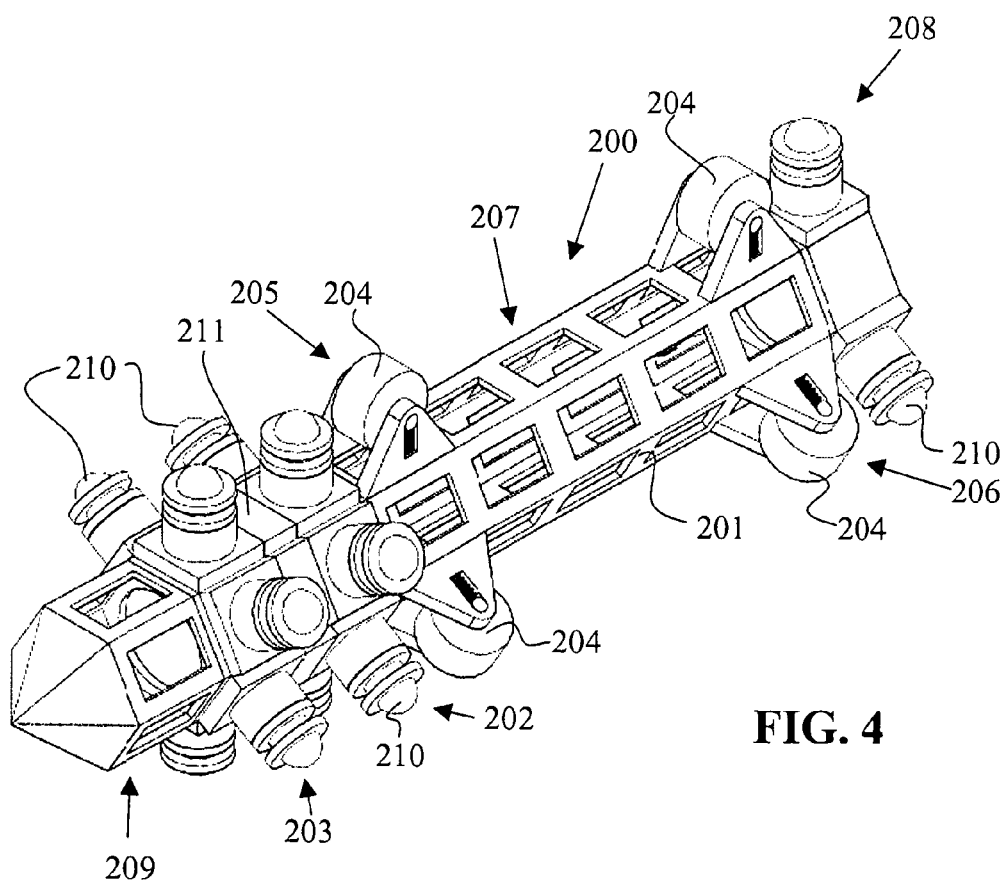
FIG. 4 shows a view in perspective of a second exemplary embodiment of a device according to the invention.
Figure 5:
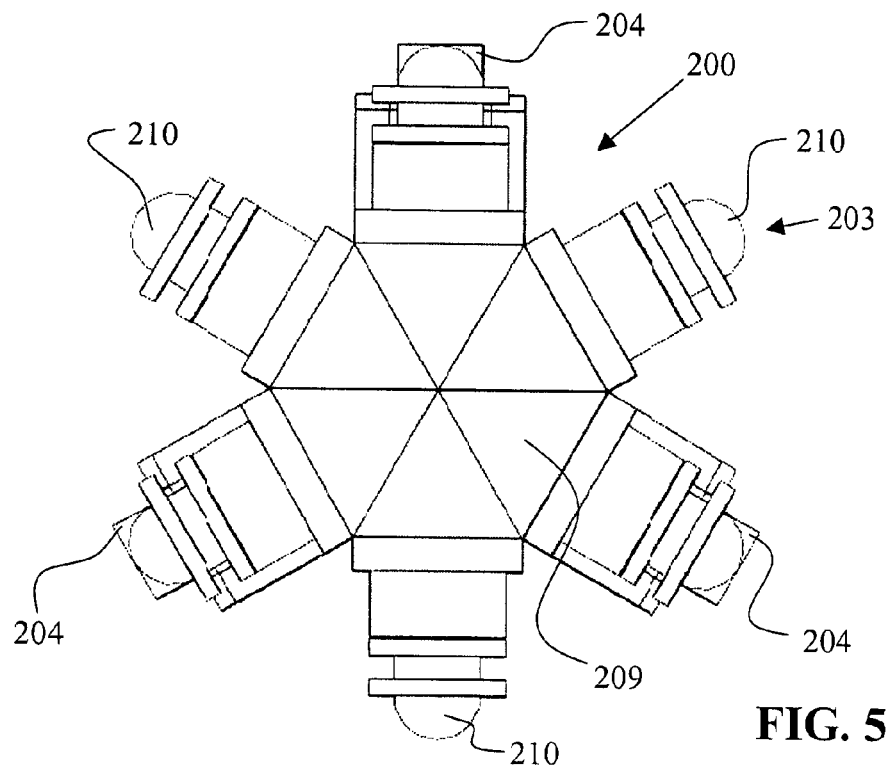
FIG. 5 shows a front-view of the device of FIG. 4.

In a second exemplary embodiment the aligning device 200 of FIG. 4 is used as internal alignment clamp for aligning pipes which are situated with their end edges near to each other. The device 200 comprises a tubular frame 201. In this embodiment the frame is substantially hexagonal in cross-section, and is provided with a first cylinder set 202 comprising six cylinders for clamping the first pipe and measure or correct deformation of said first pipe. The frame 201 further comprises a second cylinder set 203 comprising six cylinders for clamping the second pipe and making it match the shape of the first pipe as determined by the first cylinder set 202. A front view of this embodiment of the aligning device 200 is shown in FIG. 5.

The frame 201 is provided with spring loaded wheels 204 for transport of the line-up clamp through the pipes. One or more wheels 204 are motor driven. The spring-loaded wheels comprise a first series of wheels 205 which are positioned next to the first cylinder set 202, further referred to as 'front wheels'. The spring-loaded wheels further comprise a second set of wheels 206 placed at a distance from the first set of wheels, further denoted as 'rear wheels'.

Between the front wheels 205 and the rear wheels 206, a mounting space 207 is provided for mounting devices such as hydraulic pumps, hydraulic valves and/or a control computer for controlling the aligning device 200, and in particular for controlling the first cylinder set 202, the second cylinder set 203, the driven wheel(s) 204, and a third cylinder set 208 which is provided at the rear side of the aligning device 200.

In front of the second cylinder set 203 a mounting space 209 is provided for mounting a transceiver for remote control of the aligning device 200 and/or a battery pack for powering said transceiver and/or the control computer in the mounting space 207. Preferably all cylinders of the first, second and third cylinder set are individually controlled by the control computer.

In this embodiment each of the cylinders sets comprises at least three cylinders which can radially extend or retract clamping shoes 210. The cylinders are operable as movable jacks comprising hydraulic cylinder assemblies with clamping shoes 210. As can be seen in FIG. 4 the clamping shoes 210 form series running in circumferential direction of the aligning device 200.

The aligning device 200 as shown in FIG. 4 consist of a tubular main body 201 having spring-loaded fronts and rear wheels 205, 204 positioned at respectively the front end and rear end of the frame 201. At the front end of the frame 201, next to the spring-loaded front wheels 205, the first cylinder set is attached to the frame 201. Subsequently, a spacing unit 211 is attached to the first cylinder set 202, and the second cylinder set 203 is attached to the spacing member 211. Subsequently the front mounting space 209 for the transceiver is attached to the second cylinder set. At the end portion of the frame 201, next to the rear spring-loaded wheels 206, a third cylinder set 208 is provided, which can be used to keep the line-up clamp 200 straight inside the pipes. Inside the tubular frame 201 and/or the front frame 209, control and regulation means (not shown) have been arranged, with which the various parts of the device 200 can be operated and controlled.

Said unit particularly comprises a measuring device for determining the position of the clamping shoes 210, in particular at abutment against the wall of the pipe concerned, and storing said position in the memory. The alignment device 200, according to this embodiment, can be wireless controlled, for instance by remote control from the outside of the pipe. Special provisions, such as long operating lines, are not necessary for this embodiment.

When pipes have to be welded to each other with their ends, the device 200 is provided in the inside of a first pipe, and is moved to the open first end of the first pipe. When the spacing member is placed at the first end of the pipe, the device 200 is stopped. The first cylinder set 202 is being activated and the clamping shoes 210 are moved radially towards the sides of the first pipe. Also the third cylinder set 208 is activated and the clamping shoes 210 are moved against the inner side of the pipe. By controlling the first and third cylinder set, the frame 210 is placed in the centre of the pipe. The third cylinder set 208 is further controlled, such that the clamping shoes exert a clamping force on the pipe for fixing the longitudinal position of the device 200 in the first pipe.

From the position of the cylinders of the first cylinder set 202, the diameter and deviations in diameter of the pipe, in particular of the first end of the pipe, is determined. If at the first end of the first pipe the deviations from a circular cross-section of the pipe are too large, depending on the specifications of the pipe, then the cross-section can be adjusted by deforming the first end of the first pipe using the first cylinder set 202. The position of the cylinders of the first cylinder set 202 is stored in a memory of the computer as shape data.

Subsequently the second pipe is placed with a first end of the second pipe at the welding distance from and in line with the first end of the second pipe. Subsequently, the second set of cylinders 203 is activated and the clamping shoes 210 of the second set 203 are placed against the inner side of the second pipe. Subsequently the cylinders of the second cylinder set 203 are controlled based on the shape data, to match the shape of the first end of the first pipe.

Subsequently, a welding apparatus, attached to the outside of the first or second pipe, is activated to make a welding seam to connect the respective first ends of the first and second pipe. When the first and second pipe are welded to each other, the first, second and third cylinder sets are radially retracted, and the aligning device 200 can move along the inner sides of the first and second pipe towards the second end of the second pipe where the procedure can be repeated.

Figure 6:
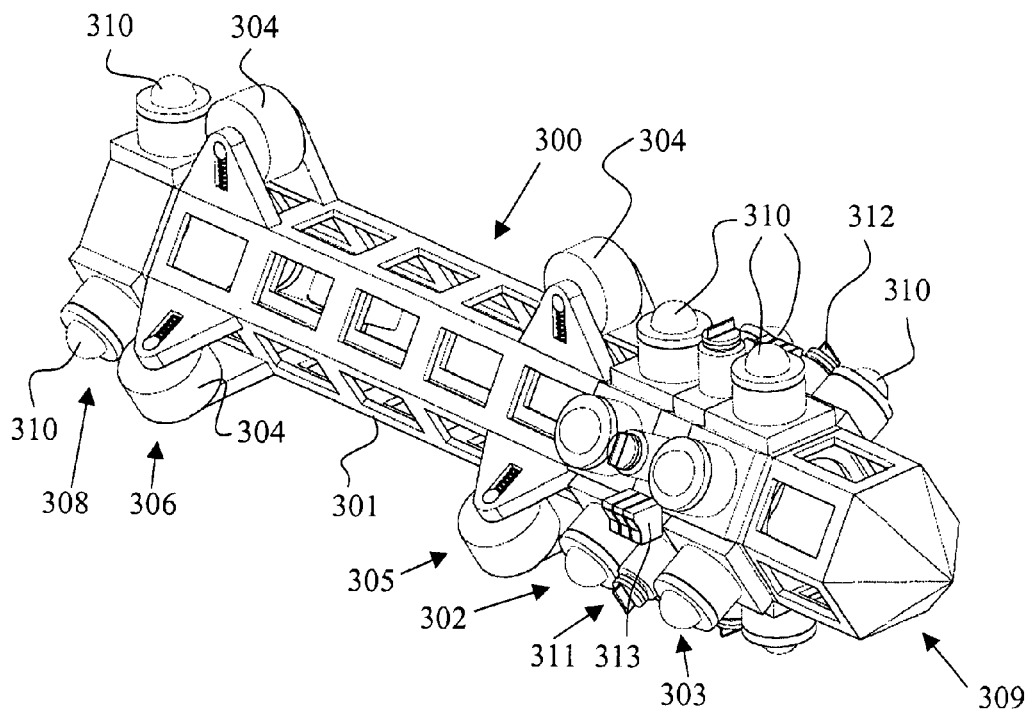
FIG. 6 shows a view in perspective of a third exemplary embodiment of a device according to the invention, where the cylinders are in a retracted position.
Figure 7:
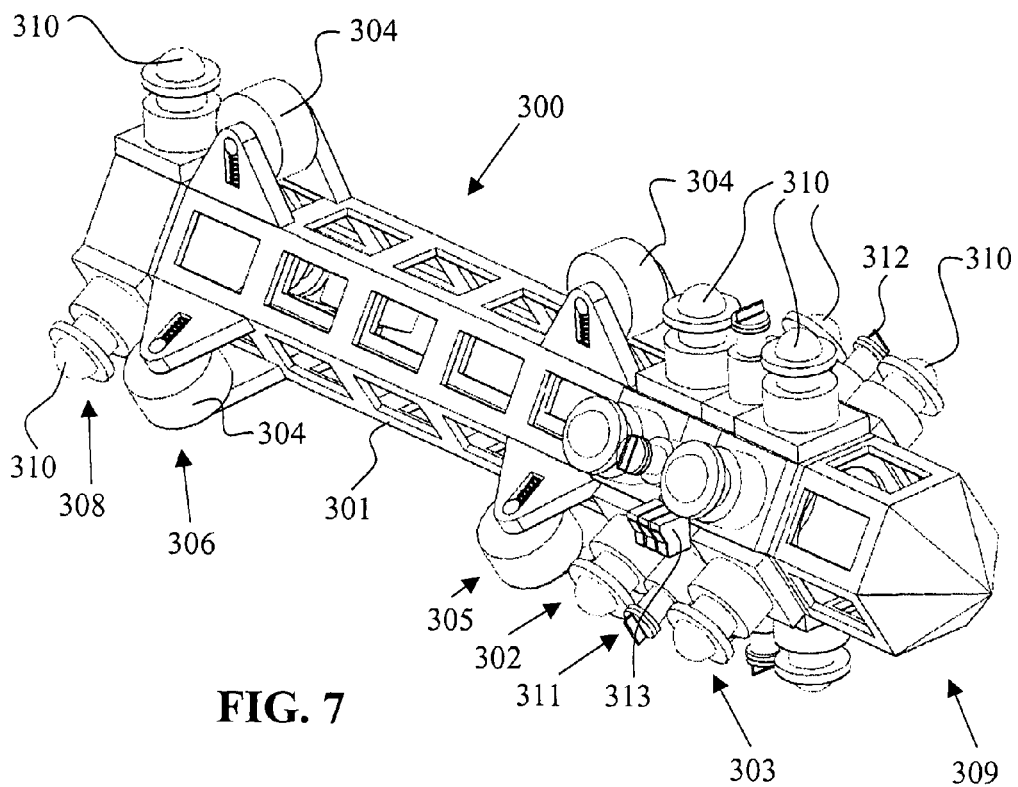
FIG. 7 shows the device of FIG. 6, where the cylinders are in an extended position.

In a third exemplary embodiment, as shown in FIGS. 6 and 7, the alignment device 300 is provided with spacing means 311 provided between the first cylinder set 202 and the second cylinder set 303. The spacing means 311 comprise a circumferential series of spaces 312 that are radially retractable and extendable by means of a fourth cylinder set. Furthermore the aligning device 300 is provided with sensors 313 for detecting the edge of the first pipe.

In use, the device 300 is provided inside the first pipe, and is moved along the pipe towards the first end of the first pipe. The sensors 313 detect the first end of the first pipe and stop the progression of the aligning device 300. In this situation, all cylinders, in particular the cylinders of the first, second, third and fourth cylinder set, are retracted as shown in FIG. 6. Only the spring-loaded wheels 304 are in contact of the inner side of the pipe.

The sensor 313 detects the first end of the first pipe and the controlling means of the aligning device 300 stops the movement of the aligning device 300 at a position wherein the spacers 312 are positioned outside the first end of the first pipe. Subsequently the spacers are extended, and the aligning device 300 is moved towards the inside direction of the first pipe until the spacers 312 abut the first edge of the first pipe.

Subsequently the first and third cylinder set is activated, such that the clamping shoes 310 of the first 302 and third 308 cylinder set, abut the inside of the pipe. Again the frame 301 is positioned at the centre line of the first pipe by controlling the cylinders of the first and third cylinder set.

The aligning device 300 with respect to the first pipe is fixed by exerting a clamping force on the inside wall of the first pipe using the third cylinder set 308. Again the shape of the first end of the first pipe is determined using the first clamping means 302, and the data pertaining to said shape is stored in a memory as shape data.

Subsequently the second pipe is positioned with the first end of the second pipe against the spacers 312. The second cylinder set 303 is activated and the clamping shoes 310 are extended to abut the inner side of the second pipe. The second cylinder set 303 is controlled in dependence of the shape data, such that the shape of the first end of the second pipe corresponds to the shape of the first end of the first pipe.

Subsequently a welding apparatus, such as a welding robot 80, can be used for making a welding seam to connect the respective first ends of the first and second pipes. During this welding procedure, the spacers 312 are one by one retracted just before the welding apparatus reaches the position of said spacer 312.

When the welding seem is completed, all the cylinders of all the first cylinder set 302, second cylinder set 303, third cylinder set 308 and fourth cylinder set 311, are retracted. The clamping apparatus 300 can then be moved along the second pipe to a second end of the second pipe for repeating the above-mentioned steps to weld the second end of the second pipe to a first end of a third pipe.

A further advantage of this embodiment, is that the sensor 313 for detecting the edge of the pipe, is used for controlling the movements of the aligning device 300 within the pipe. With the sensors 313, the end of a pipe can automatically be sensed and the aligning device 300 can be stopped in order to prevent falling out of the end of the pipe. Damage to the aligning device 300 and possibly injuring of personnel in the area can thus be prevented.

Figure 8:
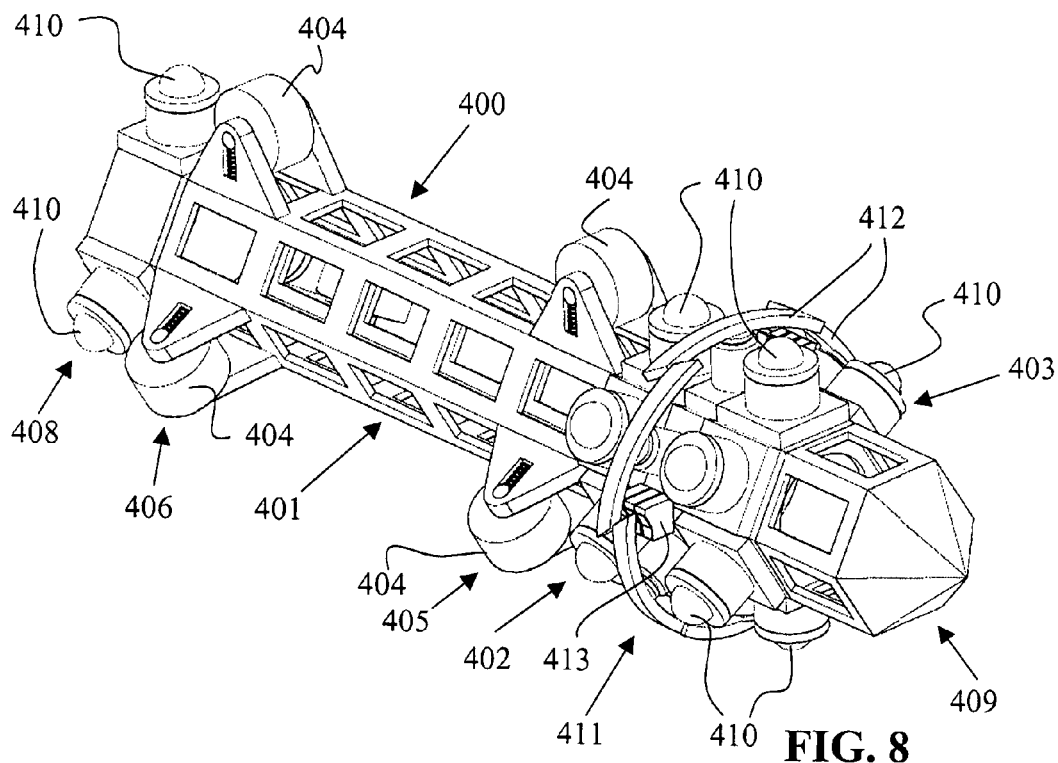
FIG. 8 shows a view in perspective of a fourth exemplary embodiment of a device according to the invention, where the cylinders are in a retracted position.
Figure 9:
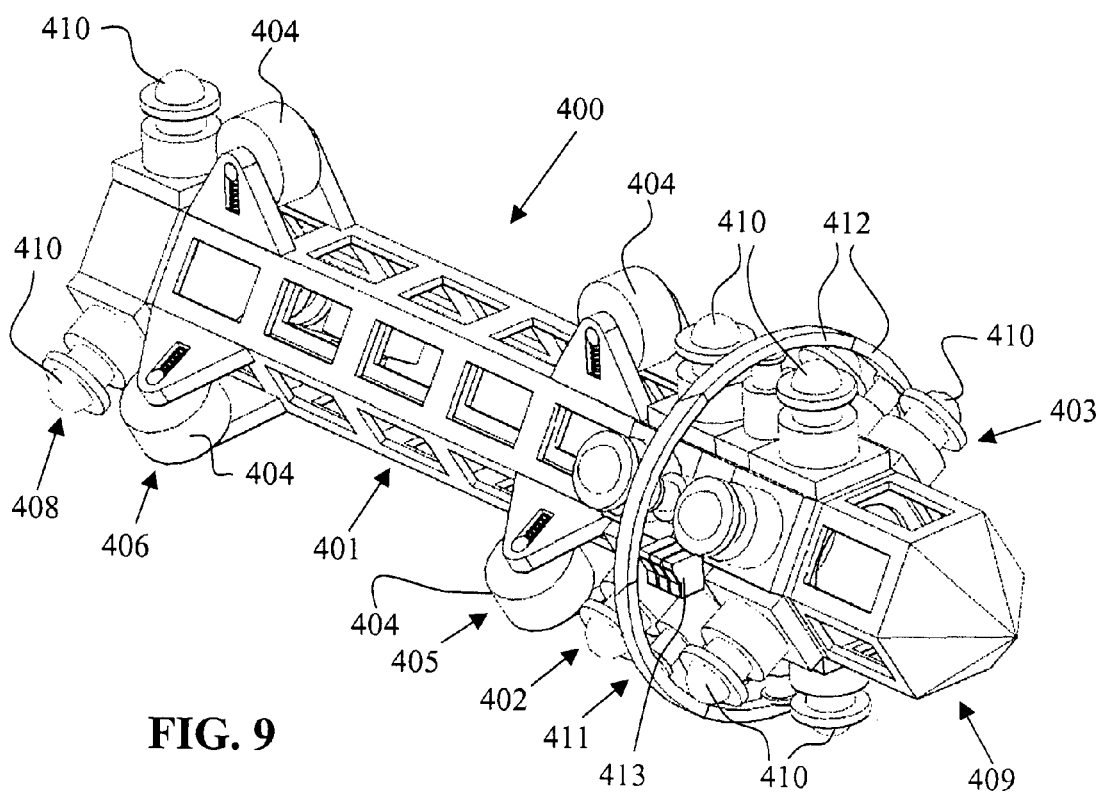
FIG. 9 shows the device of FIG. 8, where the cylinders are in an extended position.
Figure 10:
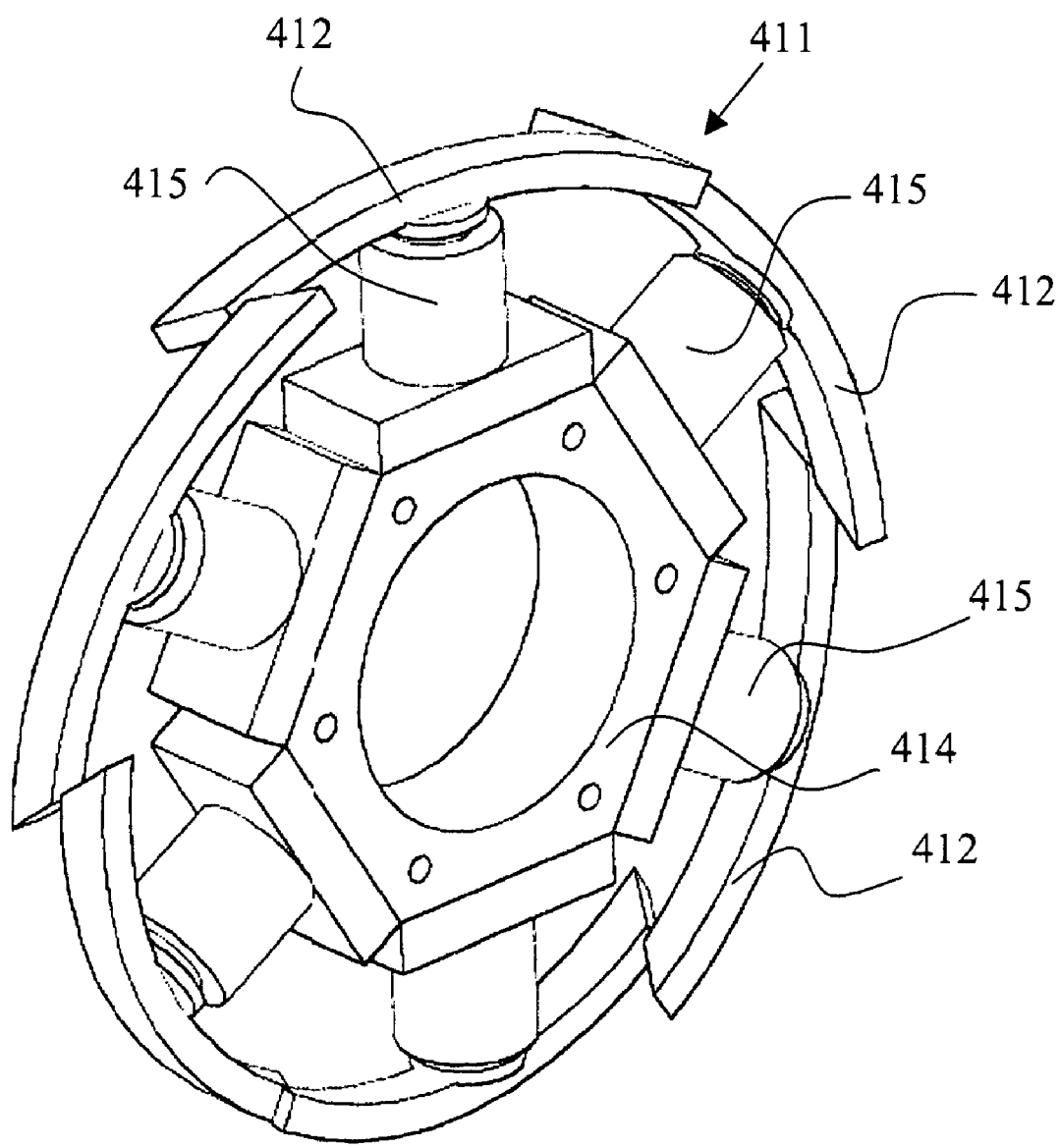
FIG. 10 shows the backing means of the device of FIG. 8 in detail.

In a fourth exemplary embodiment as shown in FIGS. 8, 9 and 10, the aligning device 400 is provided with backing means 411, which are provided between the first clamping means 402 and second clamping means 403. Said backing means 411 comprise a circumferential series of backing shoes 412 that are radially retractable and extendable by means of a fourth cylinder set. This embodiment is also provided with sensors 413 for controlling the movement of the aligning device 400 and positioning said aligning device 400 with respect to the first end of the first pipe.

In use, the aligning device 400 is provided at the inside of a first pipe, and is moved along the first pipe towards the open end of said first pipe. The sensor 413 detects the first end of the first pipe and sends a signal to the control unit which controls the movement of the aligning device 400 such that the centre position of the fourth cylinder set 411 is placed at the first end of the first pipe.

Subsequently the cylinders of the first 402 and third 408 cylinder set are extended for engaging the inner side of the first pipe, and the frame 401 of the aligning device 400 is placed at the centre line of the first pipe. Subsequently, the cylinders of the third cylinder set 408 are activated to exert a clamping force to the side of the first pipe for fixing the position of the aligning device 400.

The shape of the first pipe, in particular the first end of the first pipe, is determined with help of the first clamping means 402. The data pertaining to said shape is stored in a memory as shape data.

Subsequently the second pipe is positioned at a welding distance from and in line with the first end of the first pipe. The second set of cylinders 403 is activated and the clamping shoes 410 thereof are extended for engaging the inner side of the second pipe. The engagement of the clamping shoes 410 of the second clamping means 403 is based on the shape data.

Subsequently the cylinders of the fourth cylinder set 411 are activated and the backing shoes 412 are positioned against the side of the first pipe at the first end thereof, against the side of the second pipe at the first end thereof, and bridging the welding distance. This situation is schematically depicted in FIG. 9.

With the backing shoes 412 in place, a welding apparatus on the outside of the pipe can be activated to make welding seam to connect the respective first ends of the first and second pipes.

When the welding seam has been completed, all the cylinders of the first cylinder set 402, second cylinder set 403, third cylinder set 408 and fourth cylinder set 411 are retracted such that the clamping apparatus 400 can be moved along the second pipe to a second end of the second pipe to weld the second ends of the second pipe to a first end of a third pipe.

As shown in FIG. 10, in more detail, the pistons of the cylinders 415 are not only extendable and retractable, but also rotatable, such that in the retracted position, as shown in FIG. 10, the ends of the individual backing shoes 412 are slightly rotated in clockwise direction such that these ends of the backing shoes 312 do not obstruct the retraction of the cylinders 415. In particular, all cylinders 415 of this embodiment rotate the backing shoes 412 in the same direction (clock wise or counter clock wise) as shown in FIG. 10. Subsequently, after rotation, the cylinders can be retracted, as shown in FIG. 8.

Figure 3:
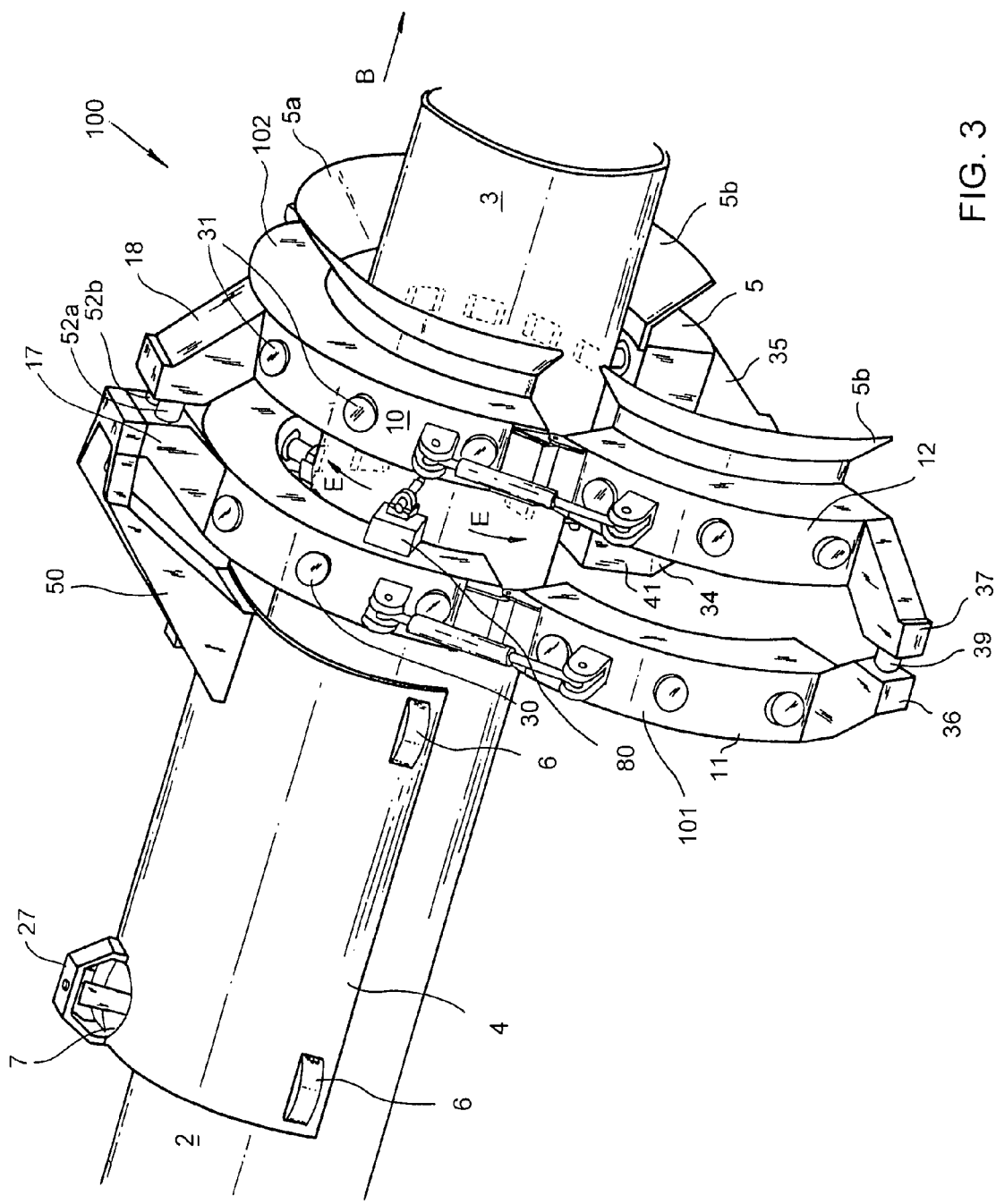
FIG. 3 shows a view in perspective of the device of FIG. 1, however from another side.

Although the embodiments as shown in FIGS. 4, 5, 6, 7, 8, 9 and 10 are disclosed in combination with an external welding apparatus, this welding apparatus can also be provided on the supporting frame of the aligning device 200, 300, 400. In a further embodiment, said welding means are provided between the first clamping means 202 and the second clamping means 203. In particular, the device 200 can be provided with a guide for a welding robot extending in circumferential direction of the frame 201. When the aligning device 200 with the welding apparatus has been installed, the welding seem can be made with the help of a welding robot in the same way as shown in FIG. 3.

The invention claimed is:

1. A device for clamping a plurality of pipes to each other, said device comprising (a) a rigid frame, (b) first and second clamping means supported on the frame for tightly engaging sides of respective first and second pipes having respective ends in line with and at a welding distance from each other, (c) movement means on the frame for moving the frame along the plurality of pipes, (d) means for operating the first clamping means, (e) means for determining an abutment position of the first clamping means, (f) means for storing data concerning the abutment position of the first clamping means in a memory, (g) means for operating the second clamping means, and (h) control means for controlling movement of the second clamping means to a position based upon the stored data concerning the abutment position of the first clamping means.

2. The device according to claim 1, wherein the first and second clamping means comprise a circumferential series of clamping shoes that are radially retractable and extendible.

3. The device according to claim 1, wherein the first and second clamping means are adjustable between open and closed positions such that they can be disposed along a part of a circumference of the frame in the closed position.

4. The device according to claim 3, wherein in the open position the first and second clamping means take up approximately 180 degrees or more of the circumference of the frame.

5. The device according to claim 1, wherein the frame comprises first and second frame parts, the first and second clamping means being disposed on the first and second frame parts respectively, the device comprising connection means for connecting the first and second frame parts and for moving the first and second frame parts toward and away from each other in an axial direction.

6. The device according to claim 1, wherein each of the means for operating the first clamping means and the means for operation the second clamping means comprise means for urging the respective clamping means from a position at which they initially abut a pipe to a clamping position.

7. The device according to claim 1, wherein rollers are provided on or at the frame for engaging the sides of the first and second pipes, said rollers being rotatable about an axis perpendicular to a center line of the device.

8. The device according to claim 1, wherein the frame comprises driving means for moving the frame along the pipes.

9. The device according to claim 1, wherein said device further comprises spacing means, said spacing means are provided between the first and second clamping means and being supported on the frame.

10. The device according to claim 1, wherein said spacing means comprise a circumferential series of spacers that are radially retractable and extendible.

11. The device according to claim 1, wherein said device further comprises backing means, said backing means are provided between the first and second clamping means and being supported on the frame.

12. The device according to claim 11, wherein said backing means comprise a circumferential series of backing shoes that are radially retractable and extendible.

13. The device according to claim 1, wherein said device further comprises welding means, said welding means is being supported on the frame, wherein said welding means is provided between the first and second clamping means.

14. The device according to claim 1, wherein said device further comprises third clamping means for clamping the pipes, said third clamping means being supported on the frame such that said first clamping means is positioned between said second and third clamping means.

15. The device according to claim 1, wherein said device further comprises a transceiver for remote control of said device.

* * * * *